United States Patent [19]
Archie et al.

[11] Patent Number: 5,969,273
[45] Date of Patent: Oct. 19, 1999

[54] METHOD AND APPARATUS FOR CRITICAL DIMENSION AND TOOL RESOLUTION DETERMINATION USING EDGE WIDTH

[75] Inventors: Charles N. Archie, Granite Springs; Mark E. Lagus, Millbrook; Diana Nyyssonen, deceased, late of Hopewell Junction, all of N.Y.; by Jeffrey Swing, legal representative, Wellesley, Mass.; Eric P. Solecky, Wappingers Falls; Donald C. Wheeler, Beacon, both of N.Y.

[73] Assignee: International Business Machines Corporation, Armonk, N.Y.

[21] Appl. No.: 09/023,059

[22] Filed: Feb. 12, 1998

[51] Int. Cl.[6] ................................................. G01M 19/00
[52] U.S. Cl. ........................ 73/865.8; 356/358; 356/355
[58] Field of Search .................................... 73/865.8, 104, 73/105; 356/355, 358; 11/356

[56] References Cited

U.S. PATENT DOCUMENTS

| 4,408,884 | 10/1983 | Kleinknecht et al. | 356/355 |
| 4,818,110 | 4/1989 | Davidson | 356/358 |
| 4,835,402 | 5/1989 | Guillaume . | |

FOREIGN PATENT DOCUMENTS

| 61-11714 | 1/1986 | Japan . |
| 6-26833 | 2/1994 | Japan . |

OTHER PUBLICATIONS

Diana Nyyssonen, "Practical method for edge detection and focusing for linewidth measurements on wafers", Optical Engineering, Jan., 1987, vol. 26, No. 1, pp. 81–85.

*Primary Examiner*—Max Noori
*Attorney, Agent, or Firm*—Ratner & Prestia; Tiffany L. Townsend

[57] ABSTRACT

A method for monitoring a process in which a feature is formed on a substrate. A plurality of dimensions of the feature are measured using a tool. An edge width of the feature is calculated based on the plurality of dimensions. The edge width is used to determine whether the process is operating within a desired specification. The calculated edge width is compared to a baseline edge width measurement to determine a difference between them. The process is determined to be operating within the specification if the difference is less than a threshold value. If the difference is greater than or equal to the threshold value, the method determines whether the difference is caused by a change in resolution of the tool. A plurality of diagnostic measurements of the edge width may be performed. The tool is adjusted to have a respectively different focus for each respective one of the plurality of diagnostic measurements. The method includes determining that the difference between the calculated edge width and the baseline edge width is caused by a change in resolution of the tool if any one of the plurality of diagnostic measurements of the edge width differs from the baseline edge width by less than the threshold value. The method also includes determining that the process is not operating within the specification, if the difference is greater than or equal to the threshold value, and the difference is not caused by a change in resolution of the tool.

19 Claims, 9 Drawing Sheets

FIG. 11C
MEASURED TOPOGRAPHY

FIG. 12C
VERTICAL SIDE-WALLS ACCURATELY PROFILED

FIG. 11B
AFM "BOOT" TIP

FIG. 12B

FIG. 11A
TRENCH

FIG. 12A
LINE

METHOD AND APPARATUS FOR CRITICAL DIMENSION AND TOOL RESOLUTION DETERMINATION USING EDGE WIDTH

BACKGROUND OF THE INVENTION

Most modern electric circuits are formed as "printed" circuits on a substrate, either through an additive process (e.g., plating or growing) or a subtractive process (e.g., etching). In the field of circuit fabrication, one of the more critical functions is the ability to control the size (length and width) of features, or critical dimensions (CDs). Any deviation in the dimensions of a feature can adversely impact on the performance of the resulting circuitry.

As metrology scanning electron microscopes (SEMS) are becoming more and more complicated, complex pattern recognition routines, measurement, and focusing algorithms are quickly making SEMs one of the most complicated tools on the production line. One problem associated with the use of SEMs that has been known for a long time is the need to obtain best focus and stigmation at a high degree of accuracy. Any improvement in focus and stigmation control techniques would enhance the quality of the CD SEM measurements.

Typically, conventional SEM tools have their focus checked manually. An operator looks at an image provided by the SEM. The operator adjusts the focus till he or she subjectively perceives that the tool is best focused. Conventional SEM process and tool control may not, however, be sensitive enough.

A second conventional focus method uses an optical microscope to map the "z" position of the features being measured optically, then uses a calibration equation, transposing the "z" position values to objective lens current values that correspond to a SEM focus value for each of the sites that was focused on optically. The assumption in this method is that the optical focusing technique is repeatable enough that errors are not introduced when the calibration process takes place. This method suffers from poor repeatability due to many variables that may contribute to poor calibration. Other optical techniques may also be used. For example, a laser may be directed onto the surface of the wafer and collected by a photodiode. The distance between the wafer and the light source may thus be determined. An optical focusing technique may not provide the most accurate focus or resolution, however, for tools (e.g., SEM or atomic force microscope (AFM)) other than optical microscopes.

Assuming that the tool is properly focused, the manufacturing process is monitored by performing line width measurements on a daily basis, to determine whether the CD SEM is reporting within the allowable statistical process control (SPC) limits for a given workpiece, such as a semiconductor wafer. Implicit in this method is the assumption that the tool has retained its focus. If, in fact, the tool is not at its optimal focus, and the line width measurements deviate from the baseline, the data are confounded, and it is not possible to accurately determine whether the process itself is operating within its normal specifications (and the tool resolution has changed) or the tool resolution is correct but the process is fabricating products that are out of specification.

For some SEM process and tool control methods, the SPC limits are extremely close to the limit of precision of current metrology techniques. New techniques are needed, therefore, to control CD in SEM metrology at increasingly more stringent levels. In addition, new techniques are required to accommodate new measurement tools, such at the AFM.

SUMMARY OF THE INVENTION

The invention is a method and apparatus for monitoring a process in which a feature is formed on a substrate. A plurality of dimensions of the feature are measured using a tool. An edge width of the feature is calculated based on the plurality of dimensions. A determination is then made as to whether the process is operating within a desired specification based on the edge width.

DETAILED DESCRIPTION

In controlling feature widths, errors in edge determination are one of the biggest contributors to the lack of precision of the manufacturing process. As feature widths become smaller, the edge widths become a more significant component of the overall feature width. Traditionally, a line width measurement is a first determination of the edges. Additional parameters that provide information about focus and stigmation are desirable. A determination has been made that the edge width inherently carries with it information about the slope of the particular process line or contact hole being measured. If only the line width is tracked, it is difficult to evaluate the quality of the process, because of the limited information carried by the bottom width. Incorporating the edge width, one can obtain information about the slope, which gives even more information about potential manufacturing process problems down the line. Thus, the edge width is an important sensitivity parameter for evaluating the quality of the product and the consistency of the process producing the product.

According to the present invention, the edge width of a feature may be derived from a measured waveform. The edge width information may be used to diagnose and improve a variety of imaging tools that interpret line scan data. These tools include optical microscopes, scanning electron microscopes (SEMs) and atomic force microscopes (AFMs). As the resolution of the tool changes (either due to a change in focus for an optical microscope or SEM, or due to a change in the shape of the measuring tip in the case of an AFM), the edge width measured by the tool also changes. Monitoring the edge width provides information about the performance of the tool. By using this information to control the tool, the tool performance can be improved and the quality of the measurements taken by the tool are enhanced.

According to another aspect of the invention, the tool resolution or focus, and the process itself are all monitored during the actual manufacturing process, so that the resolution (or focus) data points are optimized to match the types of features being monitored. That is, the focus is optimized for the topology and surface characteristics of the specific types of features that are being fabricated, instead of using a standard calibration pattern for the tool that is expected to provide the best average performance across a broad spectrum of feature types and surfaces.

Figure 1:
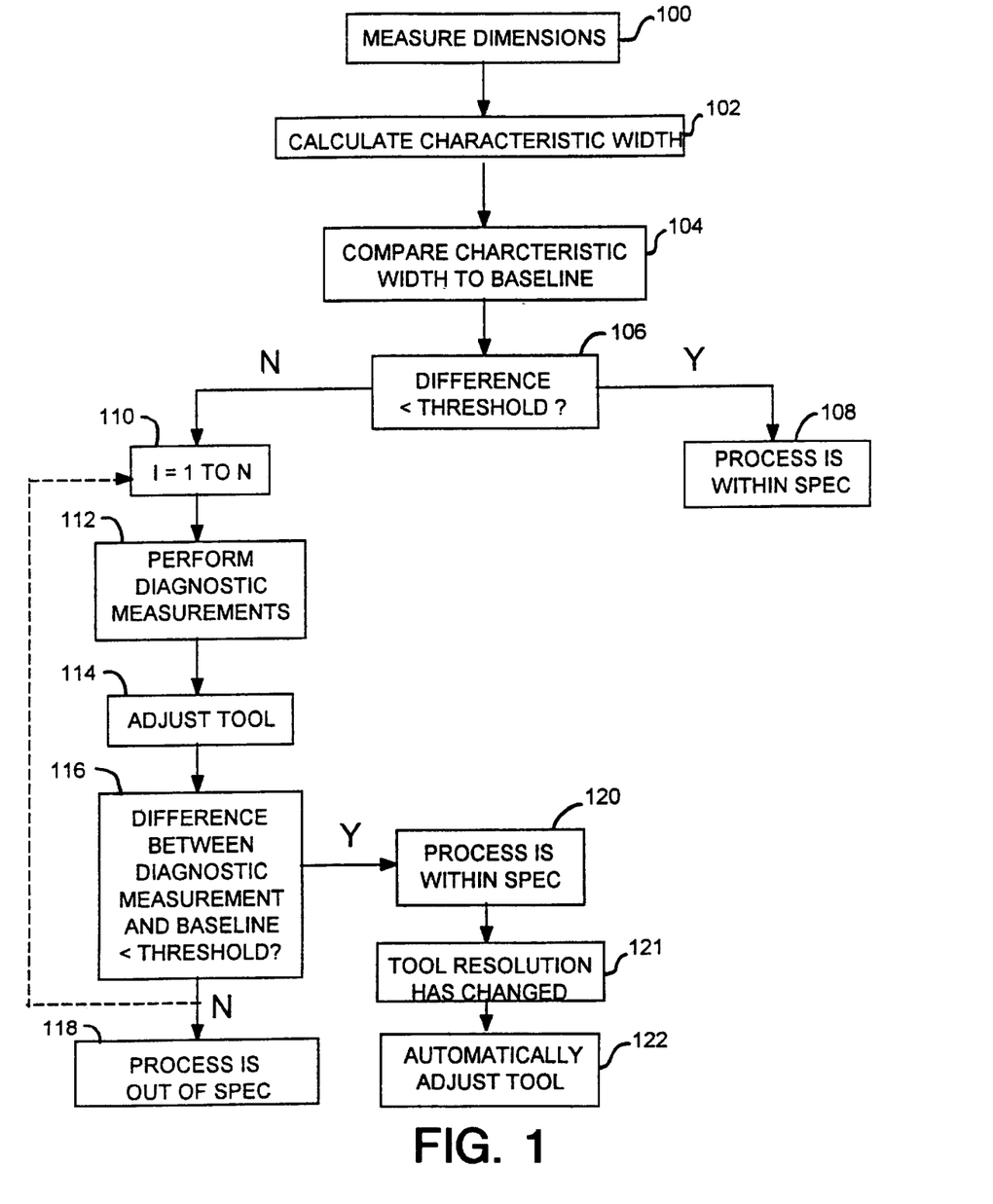
FIG. 1 is a flow chart diagram showing an exemplary method for monitoring process and tool resolution according to the invention.

FIG. 1 is a flow chart showing an exemplary method according to the invention for monitoring a manufacturing process in which a feature is formed on a substrate. At step 100, a plurality of dimensions of the feature are measured using a tool, which may be an optical microscope, SEM or AFM. At step 102, a characteristic width of the feature is calculated based on the plurality of dimensions. As explained in detail below with reference to FIGS. 2 and 3, the characteristic width may be the edge width in the case of any of the optical microscope, SEM or AFM, or as described below with reference to FIGS. 2 and 6, the characteristic width may be the "humpwidth" in the case of a SEM.

At steps 106 through 122, a method according to the invention determines whether the manufacturing process is operating within a desired specification based on the characteristic width. For brevity, the following description of FIG. 1 refers to the characteristic width as the "edge width." One of ordinary skill in the art readily understands that the method of FIG. 1 may either refer to the edge width for an optical, SEM or AFM system, or the humpwidth for a SEM system.

At step 104 the calculated edge width is compared to a baseline edge width measurement to determine a difference therebetween. The baseline edge width data are collected from a sample of a substrate similar to that now being measured, with a pattern having similar characteristics (e.g., similar thickness and surface characteristics). At step 106, the difference between the measured edge width and the baseline edge width is compared to a threshold value. If the difference is less than the threshold value, then at step 108, the manufacturing process is determined to be operating within specification.

If the difference calculated at step 106 is greater than or equal to the threshold value, then a diagnostic process is performed. For an optical system or a SEM system, the diagnostic process to determine whether the problem is due to a change in resolution of the tool, or a process problem, is as shown at steps 110–122. (As explained in detail below, the diagnostic process for an AFM is different from steps 110–122).

Figure 5:
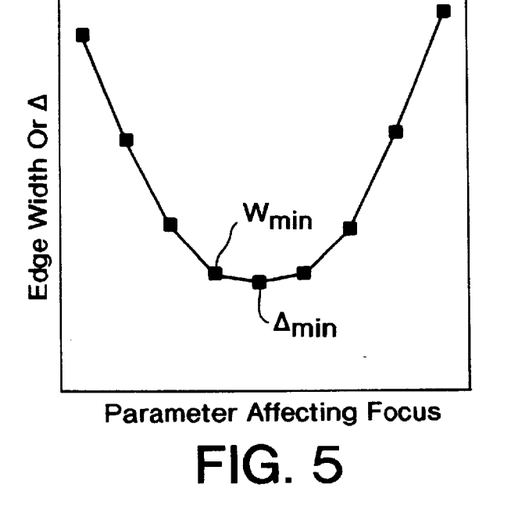
FIG. 5 is a graph showing how the edge width of the SEM waveform varies about the best focus condition in the system of FIG. 4.

At step 110, steps 112–116 are performed N times, where N is an integer greater than one. At step 112, a diagnostic measurement of the edge width is performed, using an appropriate sample from the manufacturing process being monitored. At step 114, the tool is adjusted to have a respectively different focus for each respective one of the plurality of diagnostic measurements. At step 116, the difference between the diagnostic measurement and the baseline measurement is determined. When steps 112–116 have been executed for each of the plurality of diagnostic measurements, the difference ($\Delta$) between the measurement and the baseline may be plotted or tracked as a function of the focus or resolution of the tool. An exemplary set of results is plotted in the graph of FIG. 5. As shown in FIG. 5, the difference $\Delta$ reaches a minimum value $\Delta_{min}$.

Step 116 identifies whether any of the plurality of diagnostic measurements of the edge width in steps 112–116 differ from the baseline edge width by less than the threshold value. That is, step 116 includes determining whether the difference $\Delta_{min}$ (or any other value of $\Delta$) is less than the threshold value. If any one of the plurality of diagnostic measurements of the edge width in steps 112–116 differs from the baseline edge width by less than the threshold value (i.e., the difference $\Delta$ is less than the threshold), then at step 120, the process is within the specification. Step 121 determines that the difference $\Delta$ between the calculated edge width and the baseline edge width is caused by a change in resolution of the tool. At step 122, the tool is automatically adjusted without operator intervention if resolution of the tool has changed from the baseline resolution. This automatic adjustment is described in detail below with reference to FIGS. 4 and 5.

Conversely, if none of the differences computed at step 116 (during any execution of the loop from steps 110 to 116) is less than the threshold value, then no adjustment to the tool will cause the reported measurements to be within the specification. Thus, at step 118, the process is determined to be operating outside of specification. This may be, for example, due to a problem with a photolithography tool, or the chemicals that are being used for etching or depositing the circuit patterns. One of ordinary skill in the art of semiconductor manufacturing understands that there are a large number of reasons that the manufacturing process may be out of specification; these reasons will not be described in detail herein. In an automated process, it is typically desirable to have the system trigger an alarm to notify a human operator when the process is determined to be operating outside of specified limits in step 118. One of ordinary skill in the art of programming can readily select an appropriate alarm mechanism, such as initiating a visual or auditory output from the processor monitoring the process.

In industry today, there is a desire for all types of metrology tools to be automated as much as possible. Preferably, a tool and the software that controls it should be capable of setting the tool focus in an automated way. Commercially available SEMs are highly automated tools with proprietary focusing algorithms. Typically, the purchasers of tools do not know what algorithms are used to calibrate the tools. Thus, there is a concern that the tool calibration may not be the optimal calibration for the specific products and processes being manufactured by the user of the tool. The user needs a method to determine whether to trust the data produced by the tool, or from time to time check that the tool remains within specification. This is accomplished by another aspect of the invention.

Figure 4:
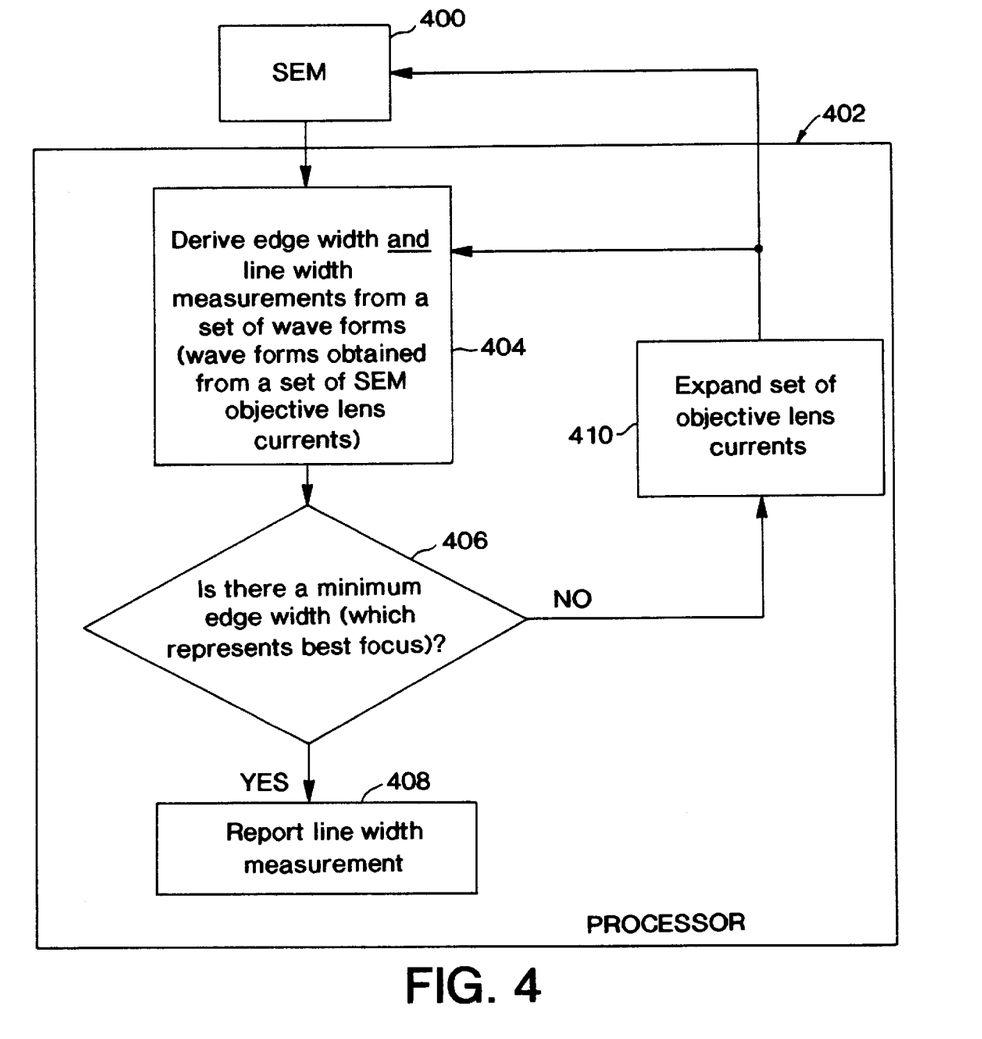
FIG. 4 is a block diagram of an exemplary system for controlling the focus of a scanning electron microscope (SEM) using the method FIG. 1.

FIGS. 4 and 5 show an apparatus and method for automatically adjusting the focus of a tool. An SEM 400 (or alternately, an optical system) is used to measure critical dimensions in a product, such as the line width in a circuit on a semiconductor wafer or an individual chip. The data are provided to a processor 402, which includes software for executing several functions. At step 404, a plurality of diagnostic measurements of the edge width and line width are taken. It is understood that these may be the data collected in step 112 of FIG. 1, or they may be additional data collected just for the purpose of adjusting the tool. At step 410, the tool is adjusted to have a respectively different resolution (focus for an SEM or optical system) for each of the plurality of diagnostic measurements. At step 406, the processor 402 identifies which of the plurality of diagnostic measurements of the edge width in step 404 has the minimum edge width (or alternately, which measurement differs from the baseline measurement by the smallest amount). With reference to FIG. 5, this may correspond to the point $W_{min}$ (when using minimum line width or edge width as the criterion), or $\Delta_{min}$ (when using the minimum difference from the baseline measurement as the criterion). At step 408, the processor 402 reports the best measurement (of line width or edge width) so the resolution of the tool can be adjusted to that setting, in step 122 of FIG. 1.

The method described herein may be applied in two dimensions. For a set of SEM stigmator values, the edge width measurement in both the X and Y directions may be determined at the best focus value. The minimum of the X and Y edge width measurements, as a function of stigmator value at best focus, represents best stigmator values.

The method of collecting and using the edge width data to monitor a manufacturing process and monitor the calibration of the tool, as described above, is generally applicable across measuring systems, with the exceptions that are noted above. A specific application of the invention to CD SEM systems is now described in greater detail.

Figure 6A:
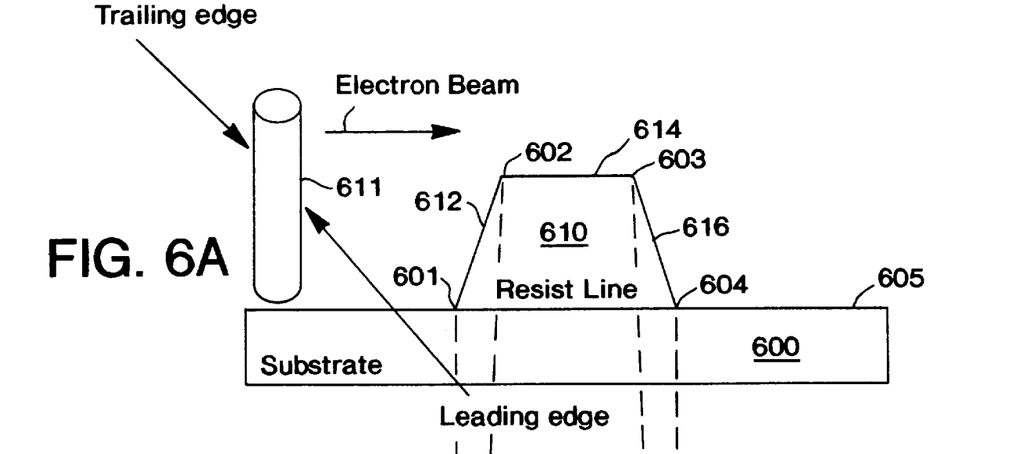
FIG. 6A is a diagram showing a SEM beam scanning across a feature on a substrate.
Figure 6B:
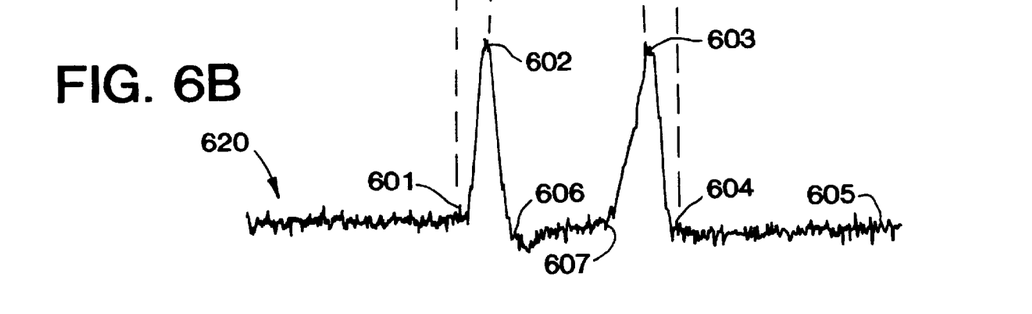
FIG. 6B is a diagram of a waveform produced by the SEM of FIGS. 4 and 6A.

FIGS. 6A and 6B show a feature 610 on a semiconductor substrate 600, and the corresponding features and artifacts in a SEM waveform produced by scanning feature 610. In FIG. 6A, a feature 610 is formed on a substrate 600. The exemplary feature is a line, but the invention may be applied to features having other geometries, such as holes or other shapes.

An electron beam 611 scans the substrate, in this case moving from left to right, to produce the waveform 620 shown in FIG. 6B. The edge information depends on the electron beam 611 itself, the interaction volume, the electron escape depth and charging artifacts. As the electron beam 611 scans to the right, when the leading edge of the beam encounters the vicinity of the corner 601, signal enhancement occurs. The amplitude of the waveform begins to increase in the vicinity of the bottom corner 601, and continues to increase along the length of the edge 612. The amplitude reaches a local maximum at point 602 in the vicinity of the top of edge 612. As the leading edge of the electron beam 611 reaches point 602, the beam 611 encounters the flat region on top of the resist line 610 and loses its enhanced signal due to the edge 612. The amplitude decreases to a new baseline value (for the resist surface) at an inner point 606, and maintains the new baseline value across the flat top surface of feature 610, until beam 611 reaches a second inner point 607. At point 607, the amplitude of the waveform again increases until it reaches a maximum value in the vicinity of the top 603 of edge 616. The amplitude again decreases along the length of edge 616, until it reaches the baseline amplitude of the substrate when the trailing edge of beam 611 reaches the vicinity of the bottom edge 604 of the feature.

The "hump" in the signal between points 601 and 606, and the hump between points 607 and 604 are characteristic artifacts generated from the interaction of the beam and the sample edges 612 and 616, respectively. By extracting key pieces of information (e.g., the edge width or the "hump width"), in addition to the feature width, one can control tool performance and process problems to a high degree of accuracy and repeatability.

Figure 7:
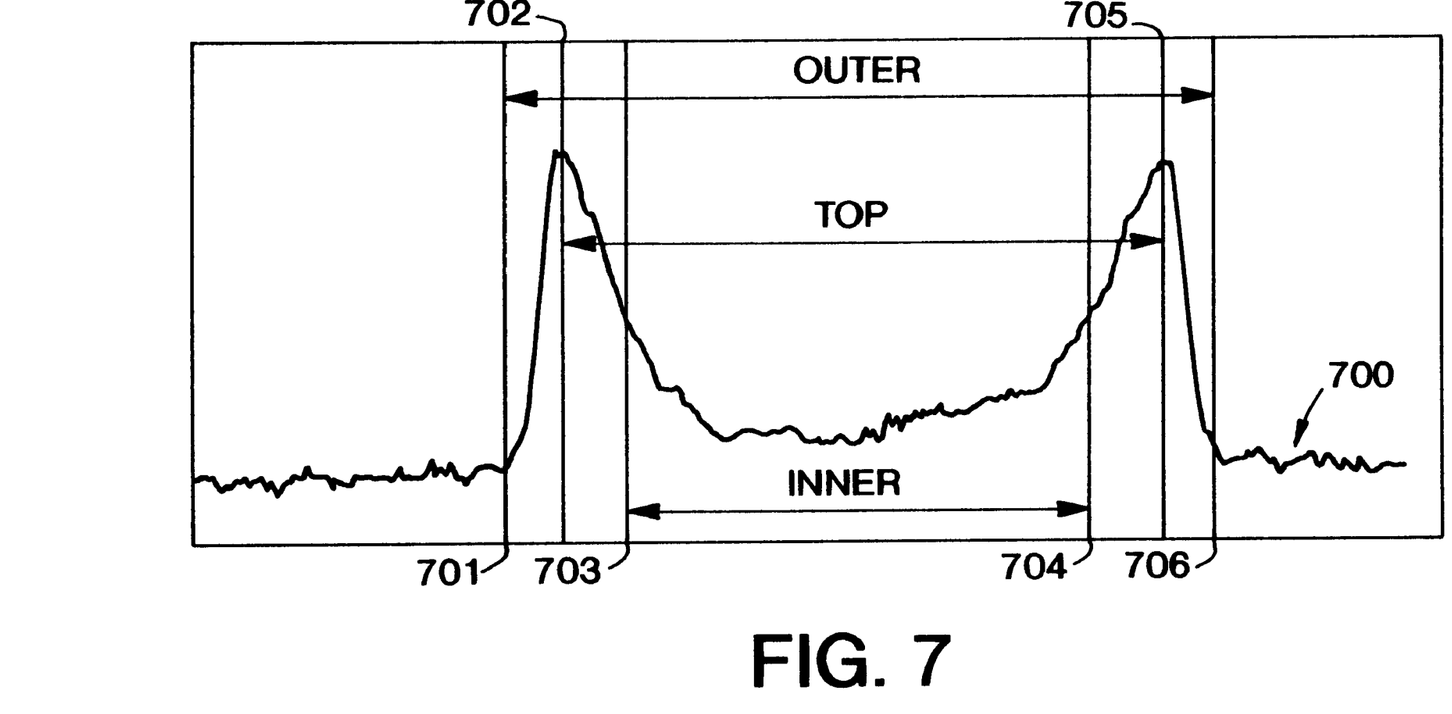
FIG. 7 is a diagram showing the characteristic widths measured in the process of FIG. 1.

FIG. 7 shows another SEM trace 700 of a line illustrating the "humpwidth." In SEM trace 700, there are two maxima or top points 702 and 705, which correspond to the vicinity of the two top edges of the line. On either side of each the two top points 702 and 705, there is a steeply sloped region of the waveform. If small, high frequency noise components of the waveform 700 are filtered out or ignored, the magnitude of the slope is greatest in the regions on either side of the two top points 702 and 705. Points 701 and 706 in waveform 700 correspond to the vicinity of the bottom corners where the feature meets the substrate. The remaining two points 703 and 704 (referred to herein as "inner points") are the points where the absolute value of the slope of the waveform begins to decrease from the maximum value near the top points 702 and 705. One of ordinary skill recognizes that these points may be determined by computing the derivative of the waveform 700, to determine the slope, and selecting the points at which the difference between the slope and the maximum slope reaches a threshold value. Thus, although the word "slope" is used extensively herein, it is understood that either a numerically calculated slope or an analog waveform corresponding to the time derivative of the SEM waveform provide equivalent information (assuming that low pass filtering is performed on the waveform to eliminate spiked noise components).

Given the above geometry in FIG. 7, the average edge width may be defined as one half the difference between the "outer" dimension (the distance between the bottom points 701 and 706) and the "top" dimension (the distance between the two top points 702 and 705). Similarly, the average "humpwidth" may be defined as one half the difference between the "outer" dimension and the "inner" dimension (the distance between the inner points 703 and 704). The edge width and humpwidth are characteristics of the SEM waveform for a particular geometry and set of surface characteristics, and may thus be used to measure the consistency and "quality" of the product.

Figure 2:
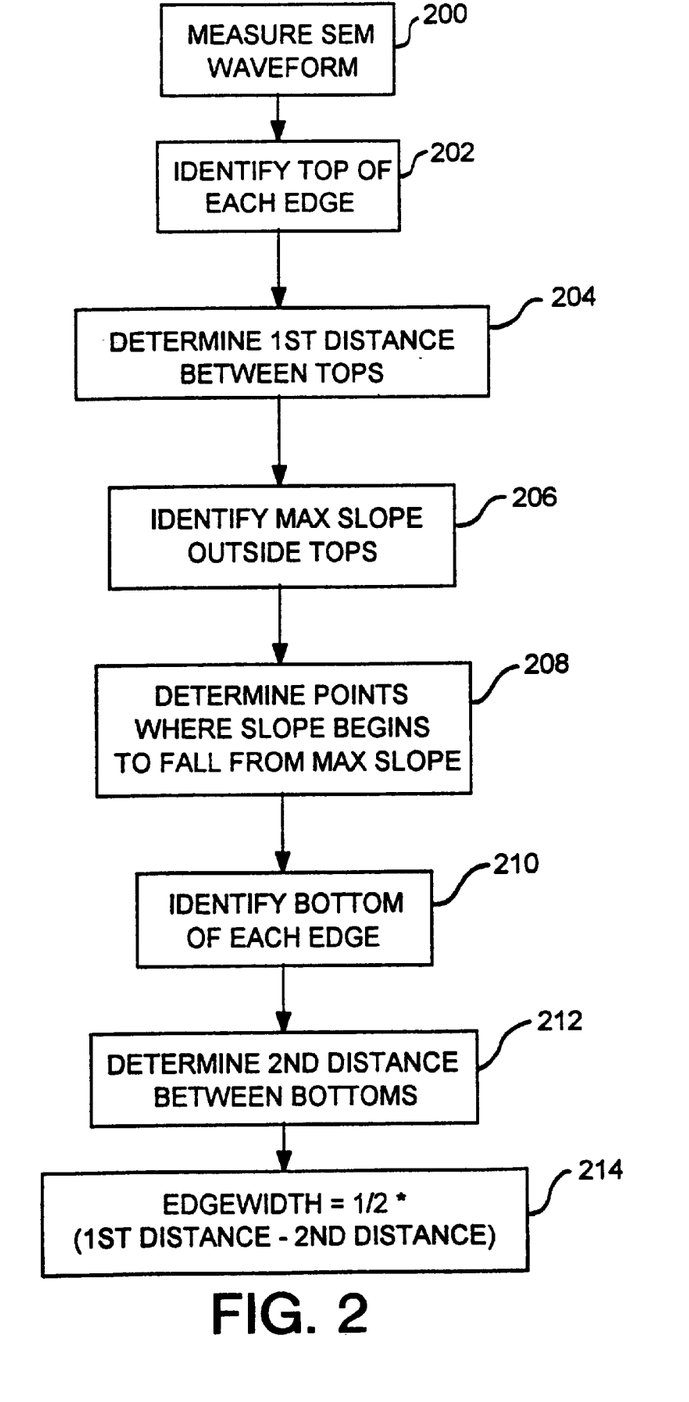
FIG. 2 is a flow chart diagram showing detailed steps for calculating an edge width as the characteristic width in FIG. 1.

FIG. 2 is a detailed flow chart of the steps for measuring the edge width. At step 200, the SEM waveform is measured. At step 202, the top of each edge is identified (for example, by finding the two maximum amplitude points in the waveform). At step 204, a first distance is computed between the tops, corresponding to the width of the flat top portion of the feature. At step 206, the maximum slope outside of the portion of the waveform between the two tops is identified. At step 208, the points at which the absolute value of the slope begins to decrease from its maximum value are identified. At step 210, the two bottom points are identified as the points where the slope decreases from the maximum value. At step 212, the second distance is determined as the distance between the two bottom edges. At step 214, the edge width is determined as one half the difference between the second width (bottoms) and the first width (tops).

Figure 3:
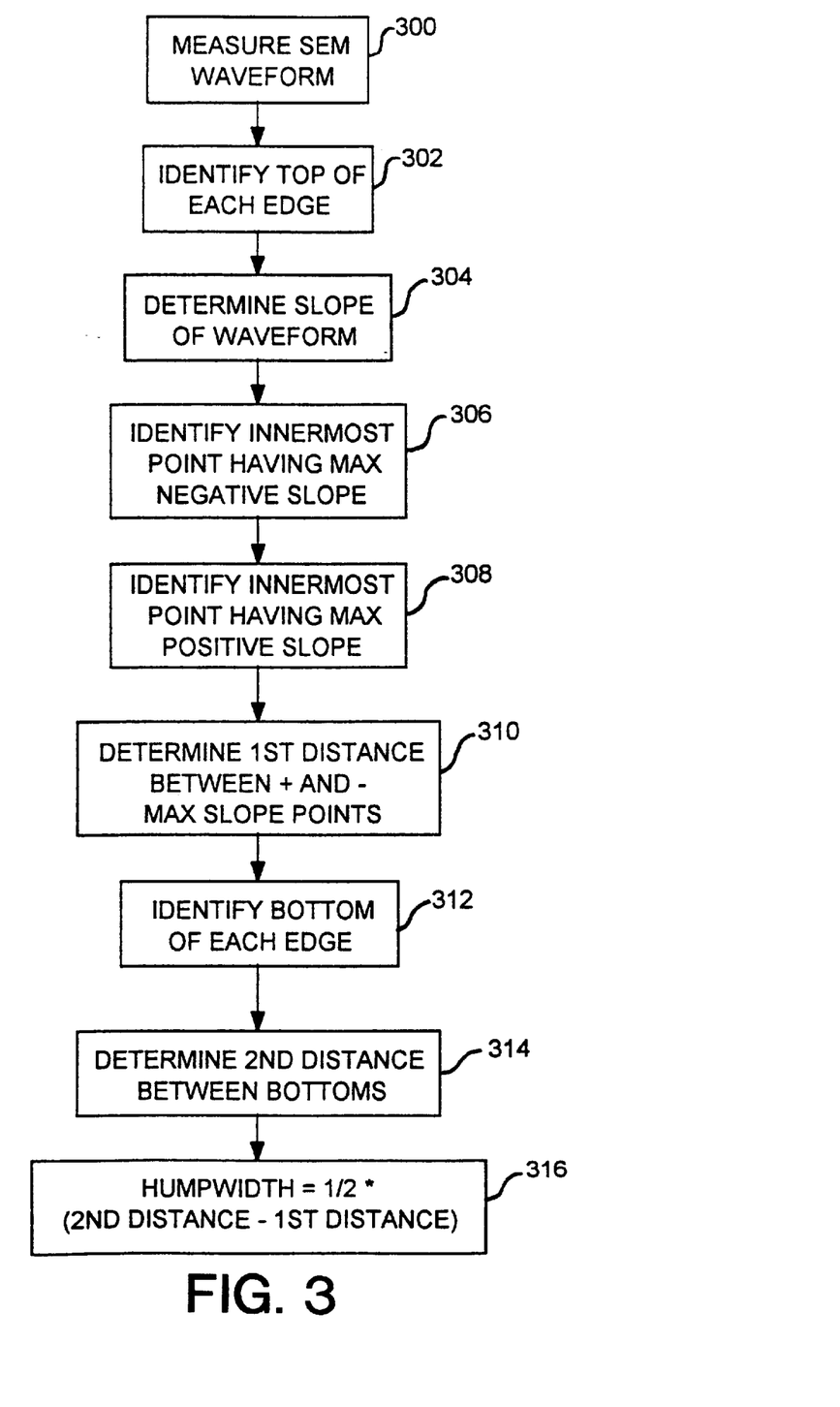
FIG. 3 is a flow chart diagram showing detailed steps for calculating an humpwidth as the characteristic width in FIG. 1.

FIG. 3 is a similar flow chart showing the method of determining the humpwidth of a SEM waveform. At step 300, the SEM waveform is measured. At step 302, the top of each edge is measured. At step 304, the slope of the waveform on either side of the top is determined. At step 306, the innermost point having the maximum negative slope (i.e., the inner point at which the value of the slope begins to increase from its largest negative value moving from left to right in the waveform) is identified. At step 308, the innermost point having the maximum positive slope (i.e., the inner point at which the value of the slope first reaches its largest positive value moving from left to right in the waveform) is identified. At step 310, a first distance is determined between the two inner points. At step 312, the bottom of each edge is determined by, for example, determining where the slope decreases from its maximum value outside of the regions between the top points. At step 314, the second distance is calculated as the distance between the two bottom points. At step 316, the humpwidth is calculated as one half the difference between the second distance and the first distance.

Figure 8:
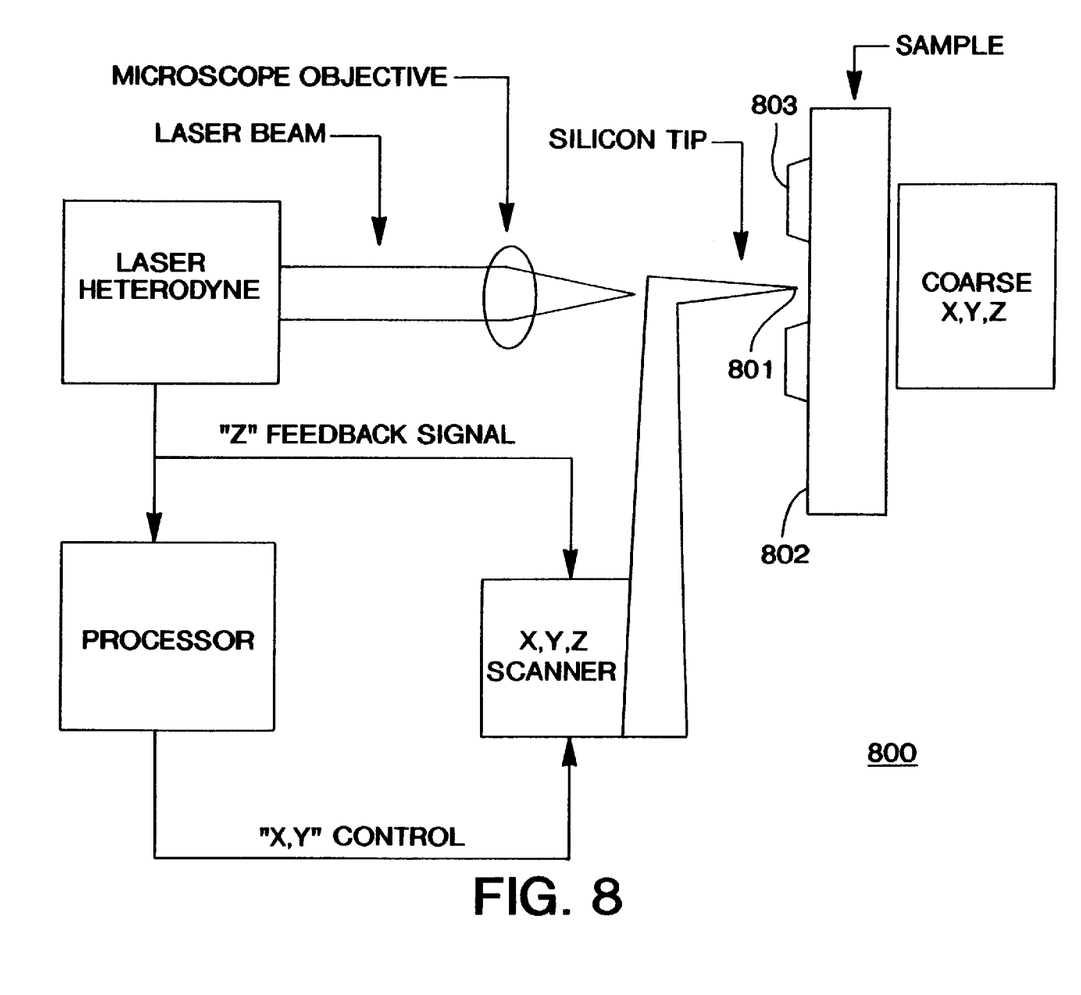
FIG. 8 is a block diagram of an exemplary atomic force microscope (AFM) which may be used in accordance with the invention.

FIG. 8 shows an exemplary AFM 800 which may be used in accordance with a further application of the invention. The AFM has a silicon tip 801. The AFM waveform may be a more accurate representation of the actual topology because this tool is analogous to a stylus that runs along the surface 802; when it encounters a feature 803, the tip 801 rises; when the surface 802 goes down, the AFM records the actual vertical motion along the axis, mimicking the actual motion of the tip 801 across the surface 802. Rather than using an electron beam, AFM 800 actually monitors the vertical motion as a function of time analogous to the stylus of an analog disc player. The AFM tip 801 is more sensitive than a stylus. With an AFM, the tip 801 does not actually touch the surface 802. It senses the surface electronically. So there is no immediate contact and, hence, no risk of damage. It provides a waveform which is similar to a topology path. The common step in both the SEM monitoring and AFM monitoring according to the invention is the identification of characteristic components of the waveform generated by the tool. An AFM waveform has a structure which may be identified as an edge.

Figures 9A, 9B, 10A, 10B:
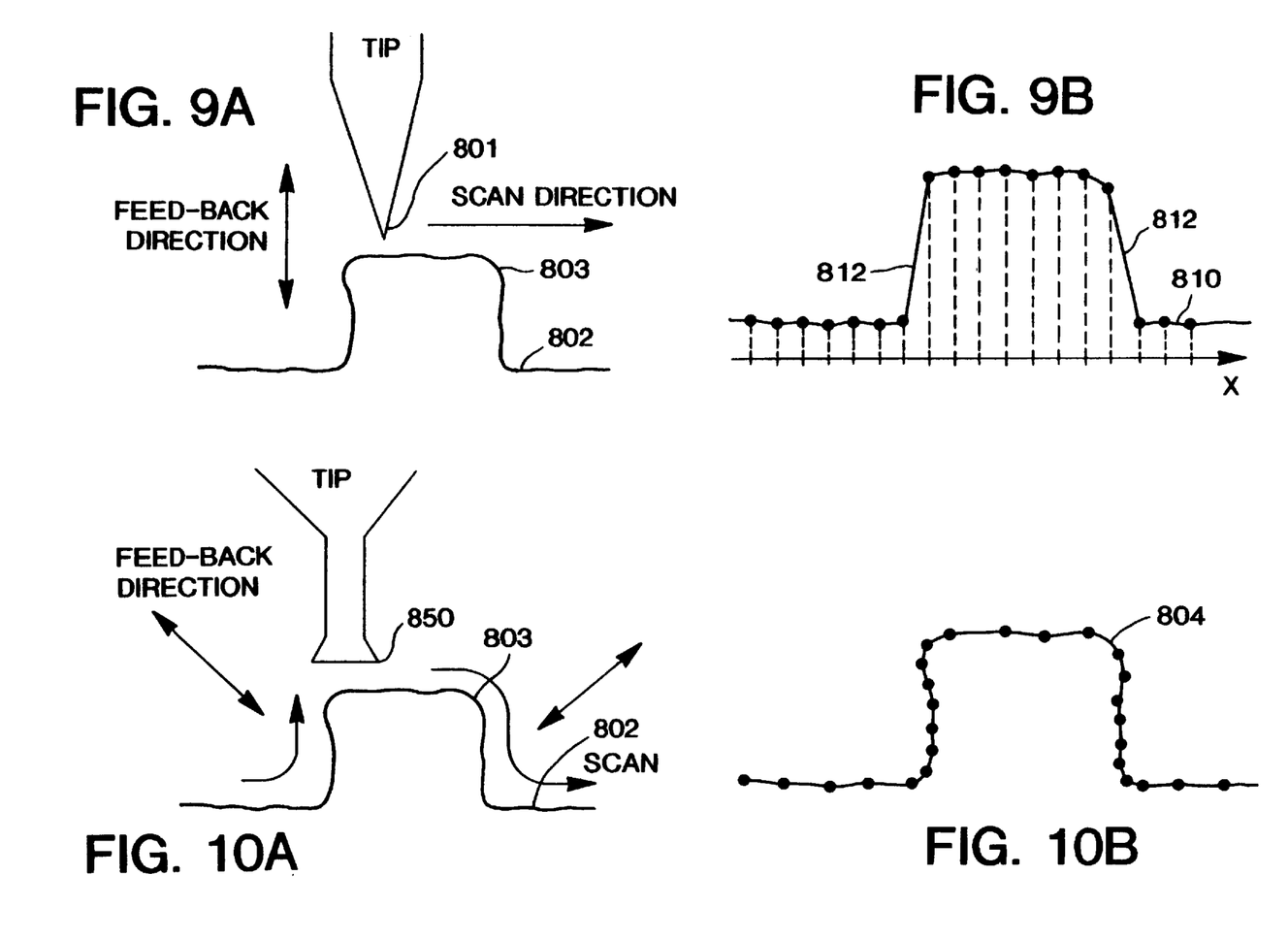
FIG. 9A shows how a one-dimensional AFM scans a feature on a substrate.
FIG. 9B shows the waveform provided by an AFM in the scan operation of FIG. 9A.
FIG. 10A shows how a two-dimensional AFM scans a feature on a substrate.
FIG. 10B shows the waveform provided by the AFM in the scan operation of FIG. 10A.

FIGS. 9A and 9B show a surface 802 (FIG. 9A) and a graph (FIG. 9B) indicating how an edge may appear in the output waveform 810 from an AFM 800 of the one dimensional type. The tip 801 can only detect changes in the "Z" coordinate of the surface, and is thus unable to detect the undercut surface of feature 803. Instead, smeared edge information 812 is provided.

FIG. 10A show a conceptual view of a two dimensional type AFM tip 850 which can measure the undercut surface of feature 803, and would be better able to provide the necessary information for measuring critical dimensions. FIG. 10B shows an exemplary waveform 804 provided by AFM tip 850.

Figure 11A:
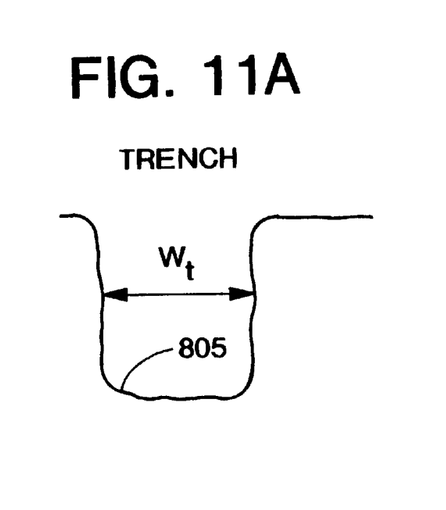
FIGS. 11A–11C show the waveform produced by a two-dimensional AFM in measuring a trench.
Figure 11B:
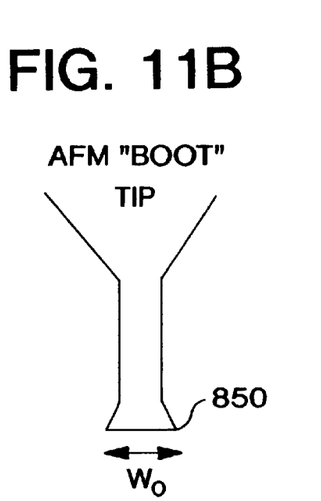
Figure 11C:
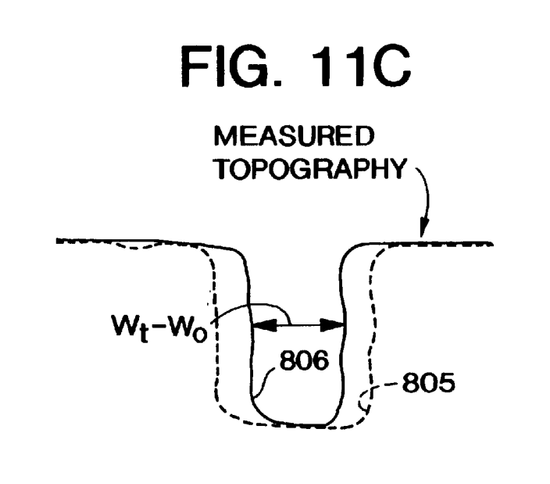
Figure 12A:
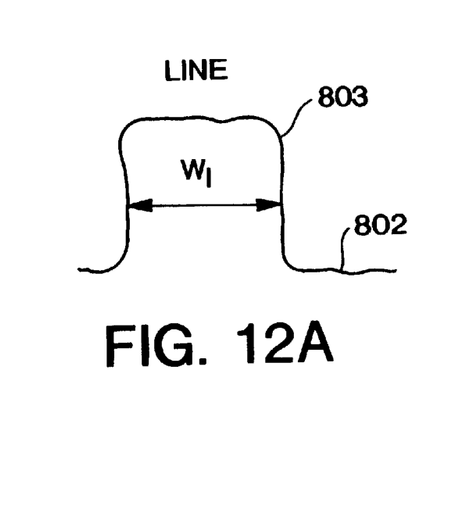
FIGS. 12A–12C show the waveform produced by a two-dimensional AFM in measuring a line.
Figure 12B:
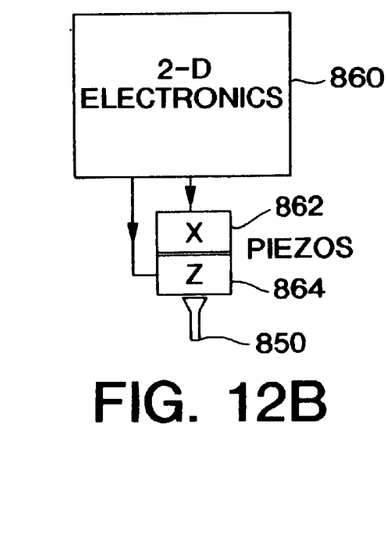
Figure 12C:
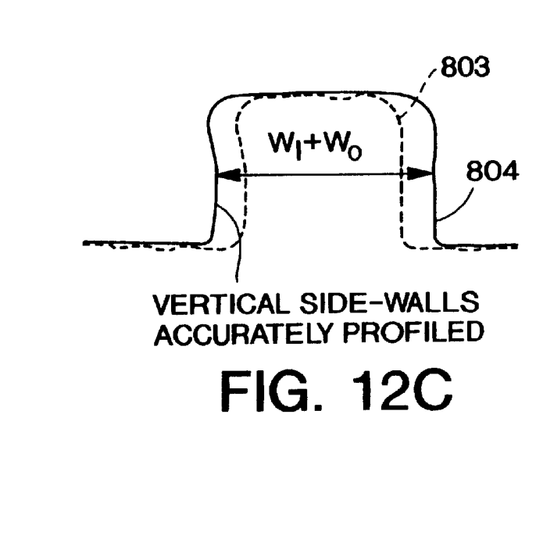

As shown in FIGS. 11B and 12B, the two dimensional AFM differs in two main respects. The tip 850 has a concave shape, enabling it to sense undercut features. Also, in addition to sensing the rising and falling "Z" axis changes of the surface, there are separate X and Z direction piezoelectric devices 862, 864 to sense both X and Z dimension changes in the surface. A two-dimensional electronics unit 860 is provided to control the movement of the tip 850 in two dimensions and process two-dimensional data.

In any event, whichever type of AFM is used, the edge measurement data are analyzed in accordance with the data that are expected for the particular type of tip being used. FIGS. 11A–11C and 12A–12C show how the waveform of the AFM appears for a trench and a convex feature. In either case, the waveform has a width dimension that differs from that of the actual surface by the width of the tip 850. In the case of a trench or concave feature 805 (FIGS. 11A and 11C), the actual feature width $W_t$ is greater than the width $W_t-W_o$ indicated in the waveform 806 by $W_o$, the width of the tip 850. In the case of a convex feature (e.g., line 803 shown in FIGS. 12A and 12C), the actual feature width $W_1$ is less than the width $W_1+W_o$ indicated in the waveform 804 by by $_oW$, the width of the tip 850. Thus, one skilled in the art recognizes that the dimensions measured depend on how the shape of the tip 850 changes over time.

Even though the AFM tip 801 (or 850) does not touch the surface 802, it can wear down in time. In the waveform output from the AFM 800, the shape of the tip 801 is convolved with the topology. What is needed is an indicator that the tip 801 changes over time. One possible indicator is that the edge information changes. With perhaps different particular features in the edge, the edge information may be used to monitor the quality of the manufacturing process as described above for the SEM.

In the description of the SEM edge measurement monitoring method described above, reference is made to an out-of-focus condition. The focus has meaning for SEM, but is not relevant to an AFM 800. The counterpart in AFM is that the tip 801 does not remain sharp after prolonged use. It becomes rounded or changed in shape, so that its contribution to the waveform is different from the waveform produced by a new tip. This change in the shape of tip 801 results in a change of resolution of the AFM in a way that is analogous to the SEM changing to an out-of-focus condition.

In the case of an AFM, a change in the edge width data could signify either that the resolution of the tool has changed, or that the process is operating outside of specifications. To determine what the cause of the problem is, a calibration of the AFM is performed. This calibration identifies a new contour of the tip 801 (or 850) of the AFM 800. The new contour information is then factored into future computations to calculate any dimension measured by the AFM. A new edge width measurement is performed after the calibration. It is then possible to determine that the difference between the currently measured data and the baseline measurements is caused by a change in resolution of the tool, if the difference between the new edge width measurement (after recalibration) and the baseline edge width measurement is less than the threshold value.

Using a method and apparatus according to the present invention (for an optical microscope, SEM, AFM or other tool), measurement quality may be enhanced. For example, a user may select a plurality (e.g., five or six) measurement sites on a wafer, and calculate the edge width at each site. This provides information about the tool variation introduced at each measurement site, by checking the mean and variation among the five or six sites. If any deviations are detected, a flag is raised and a determination of the specific site at which the problem is measured is readily made. By collecting data from a number of measurement sites, and revisiting the same measurement sites periodically, additional information may be obtained regarding whether the deviations in the observed edge width (or humpwidth) are consistent across the five or six (or more if desired) measurement sites, or are different for each.

One of the types of deviations that may be detected is a reversal in the sign of the amplitude of the waveform provided by the tool. A sign reversal may, for example, indicate that the tool has encountered a trench when a raised line is expected, or that a raised line is encountered when a trench is expected.

In a variation of the exemplary embodiment, a threshold test may be applied including performing a comparison between the sign of each datum collected, and the expected sign of the datum. A sign reversal may indicate a navigation problem in the tool; i.e., the tool is actually detecting a trench when a line is expected. The expected sign may be determined based on baseline measurements collected at the same five or six sites as described above. If a sign reversal is detected, there is an immediate indication that there is a problem (probably a navigation problem). This indication may be used to trigger an alarm. For samples which pass this threshold test (i.e., no navigation problem detected), the edge width or humpwidth would still be evaluated for diagnostic purposes.

Although the invention has been described with reference to exemplary embodiments, it is not limited thereto. Rather, the appended claims should be construed to include other variants and embodiments of the invention which may be made by those skilled in the art without departing from the true spirit and scope of the present invention.

It is claimed:

1. A method for monitoring a process in which a feature is formed on a substrate, comprising the steps of:
   (a) measuring a plurality of dimensions of the feature using a tool;
   (b) calculating an edge width of the feature based on the plurality of dimensions; and
   (c) determining whether the process is operating within a desired specification based on the edge width by:
      (c1) comparing the calculated edge width to a baseline edge width measurement to determine a difference therebetween,
      (c2) determining that the process is operating within the specification if the difference is less than a threshold value,
      (c3) determining whether the difference is caused by a change in resolution of the tool, if the difference is greater than or equal to the threshold value, and
      (c4) determining that the process is not operating within the specification, if the difference is greater than or equal to the threshold value, and the difference is not caused by a change in resolution of the tool.

2. Apparatus for monitoring a process in which a feature is formed on a substrate, comprising:
   means for receiving a plurality of measurements of the feature that are collected by a tool;
   means for calculating an edge width of the feature based on the plurality of dimensions; and
   means for determining whether the process is operating within a desired specification based on the edge width and having:
   (a) means for comparing the calculated edge width to a baseline edge width measurement to determine a difference therebetween,
   (b) means for determining that the process is operating within the specification if the difference is less than a threshold value,
   (c) diagnostic means for determining whether the difference is caused by a change in resolution of the tool, if the difference is greater than or equal to the threshold value, and
   (d) means for determining that the process is not operating within the specification, if the difference is greater than or equal to the threshold value, and the difference is not caused by a change in resolution of the tool.

3. A method according to claim 1, wherein step (c3) includes:
   (c3A) performing a plurality of diagnostic measurements of the edge width,
   (c3B) adjusting the tool to have a respectively different focus for each respective one of the plurality of diagnostic measurements,
   (c3C) identifying whether any of the plurality of diagnostic measurements of the edge within in step (c3A) differs from the baseline edge width by less than the threshold value, and
   (c3D) determining that the difference between the calculated edge width and the baseline edge width is caused by a change in resolution of the tool if anyone of the plurality of diagnostic measurements of the edge width in step (c3A) differs from the baseline edge width by less than the threshold value.

4. A method for monitoring a process in which a feature is formed on a substrate, comprising the steps of:
   (a) measuring a plurality of dimensions of the feature using a tool;
   (b) calculating an edge width of the feature based on the plurality of dimensions;
   (c) determining whether the process is operating within a desired specification based on the edge width;
   (d) determining whether the resolution of the tool has changed from a baseline resolution, based on the edge width; and
   (e) automatically adjusting the resolution of the tool without operator intervention if resolution of the tool has changed from the baseline resolution.

5. A method according to claim 4, wherein step (e) includes:
   A method according to claim 4, wherein step (e) includes:
   (e1) performing a plurality of diagnostic measurements of the edge width,
   (e2) adjusting the tool to have a respectively different resolution for each of the plurality of diagnostic measurements,
   (e3) identifying which of the plurality of diagnostic measurements of the edge width in step (e1) differs from the baseline edge width by a smallest amount, and
   (e4) adjusting the resolution of the tool to a setting which produces the smallest amount of difference in step (e3).

6. A method according to claim 1, wherein the tool is a scanning electron microscope.

7. A method according to claim 6, wherein step (a) includes measuring a first width of the feature at a bottom surface of the feature and a second width of the feature at a top surface of the feature.

8. A method according to claim 7, wherein step (b) includes calculating the edge width based on the difference between the first width and the second width.

9. A method according to claim 8, wherein step (a) includes:
   (a1) measuring an amplitude of a waveform generated by the scanning electron microscope,
   (a2) identifying a respective point on each side of the feature as the top of a respective edge, such that the waveform has a maximum amplitude at each of the points identified as the top of one of the edges, and
   (a3) calculating the second width as a distance between the respective points identified in step (a2).

10. A method according to claim 8, wherein step (a) further includes:

(a4) calculating the derivative of the amplitude at a plurality of points proximate to each point identified as the top of one of the edges, (a5) identifying a respective point on each side of the feature as the bottom of a respective edge, such that the absolute value of the derivative of the amplitude begins to decrease from a maximum value at each point identified as the bottom of one of the edges, and (a6) calculating the first width as a distance between the respective points identified in step (a5).

11. A method for monitoring a process in which a feature is formed on a substrate, comprising the steps of (a) measuring the feature using a scanning electron microscope, and generating from the measurement a waveform having an amplitude;

(b) identifying a respective top point on each side of the feature based on the amplitude of the waveform, each top point being the top of a respective edge;

(c) identifying a first inner point, the first inner point being a point closest to a center of the feature, at which the waveform has a maximum negative slope among the points between the two top points, and (d) identifying a second inner point, the second inner point being a point closest to a center of the feature, at which the waveform has a maximum positive slope among the points between the two top points;

(e) identifying a respective bottom point on each side of the feature based on the amplitude of the waveform, each bottom point being the bottom of a respective edge;

(f) calculating a first distance between the bottoms of the edges and a second distance between the first and second inner points; and (g) determining whether the process is operating within a desired specification based on the first and second distances.

12. A method according to claim 11, wherein the tops of the edges are located between the bottoms of the edges, and the absolute value of the derivative of the amplitude begins to decrease from a maximum value at each point identified as the bottom of one of the edges.

13. A method according to claim 12, wherein the waveform has a maximum amplitude at each of the points identified as the top of one of the edges.

14. A method according to claim 11, wherein step (g) includes determining whether the process is operating within a desired specification based on the difference between the first distance and the second distance.

15. A method of monitoring a process in which a feature is formed on a substrate, comprising the steps of:

(a) measuring a plurality of dimensions of the feature using a tool;

(b) calculating a humpwidth of the feature based on the plurality of dimensions; and (c) determining whether the process is operating within a desired specification based on the humpwidth by:

(c1) comparing the calculated edge width to a baseline edge width measurement to determine a difference therebetween, (c2) determining that the process is operating within the specification if the difference is less than a threshold value, (c3) determining whether the difference is caused by a change in resolution of the tool, if the difference is greater than or equal to the threshold value, and (c4) determining that the process is not operating within the specification, if the difference is greater than or equal to the threshold value, and the difference is not caused by a change in resolution of the tool.

16. A method for monitoring a process in which a feature is formed on a substrate, comprising the steps of (a) measuring the feature using a scanning electron microscope, and generating from the measurement a waveform having an amplitude;

(b) identifying a respective point on each side of the feature as the top of a respective edge;

(c) calculating the derivative of the amplitude at a plurality of points located between the points identified as the tops of the edges in step (b);

(d) identifying a respective inner point on each side of the feature, such that the inner points are located between the points identified as the tops of the edges in step (b), and the absolute value of the derivative of the amplitude begins to decrease from a maximum value at each inner point;

(e) identifying a respective point on each side of the feature as the bottom of a respective edge;

(f) calculating a first distance between the bottoms of the edges and a second distance between the inner points; and (g) determining whether the process is operating within a desired specification based on the first and second distances.

17. A method according to claim 1, wherein the tool is an atomic force microscope.

18. Apparatus according to claim 2, wherein the diagnostic means includes:

(a) means for performing a plurality of diagnostic measurements of the edge width, (b) means for adjusting the tool to have a respectively different focus for each respective one of the plurality of diagnostic measurements, (c) means for identifying whether any of the plurality of diagnostic measurements of the edge width differs from the baseline edge width by less than the threshold value, and (d) means for determining that the difference between the calculated edge width and the baseline edge width is caused by a change in resolution of the tool if any one of the plurality of diagnostic measurements of the edge width differs from the baseline edge width by less than the threshold value.

19. A method according to claim 15, wherein step (c3) includes:

(c3A) performing a calibration of the atomic force microscope, (c3B) performing a new edge width measurement after the calibration, and (c3C) determining that the difference is caused by a change in resolution of the tool, if the difference between the new edge width measurement and the baseline edge width measurement is less than the threshold value.

* * * * *